United States Patent
Foster (10) Patent No.: US 6,837,819 B2
(45) Date of Patent: Jan. 4, 2005

(54) TRANSFER CASE WITH TWO PLANETARY GEAR SETS HAVING A COMMON CARRIER

(75) Inventor: Thomas J. Foster, Utica, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/369,419

(22) Filed: Feb. 18, 2003

(65) Prior Publication Data

US 2004/0162176 A1 Aug. 19, 2004

(51) Int. Cl.$^7$ ............................................... F16H 37/02
(52) U.S. Cl. ........................ 475/210; 475/204; 475/205; 475/223; 475/286
(58) Field of Search .............................. 475/204, 205, 475/210, 223, 286

(56) References Cited

U.S. PATENT DOCUMENTS

| | | | |
|---|---|---|---|
| 4,440,042 A | 4/1984 | Holdeman | |
| 4,644,822 A | 2/1987 | Batchelor | |
| 4,677,873 A | 7/1987 | Eastman et al. | |
| 5,690,575 A | 11/1997 | Lippitsch | |
| 5,700,222 A | 12/1997 | Bowen | |
| 5,902,205 A | 5/1999 | Williams | |
| 5,947,858 A | 9/1999 | Williams | |
| 6,071,207 A | 6/2000 | Stephens et al. | |
| 6,152,848 A | * 11/2000 | Williams et al. | 475/204 |
| 6,155,126 A | 12/2000 | Vogt et al. | |
| 6,173,624 B1 | 1/2001 | Decker | |
| 6,230,577 B1 | 5/2001 | Showalter et al. | |
| 6,251,045 B1 | 6/2001 | Oliveira et al. | |
| 6,572,506 B2 | * 6/2003 | Williams et al. | 475/204 |
| 6,579,204 B2 | * 6/2003 | Brown et al. | 475/204 |

OTHER PUBLICATIONS

Steyr Powertrain, schematics/drawings, undated, 3 pages.
Klaus Lippitsch, "Advanced, Light Weight Transfer Case", Society of Automotive Engineers, Inc., 1995, pp. 97–102.

* cited by examiner

Primary Examiner—Roger Pang
Assistant Examiner—David D. Le
(74) Attorney, Agent, or Firm—Warn, Hoffmann, Miller & LaLone, P.C.; Greg Dziegielewski (57) ABSTRACT

A common carrier assembly that is particularly adapted for use in supporting planetary gear sets used in a four-wheel drive vehicle transfer case. The common carrier includes a drive plate, a differential plate, and a reduction plate. The drive plate positioned between the reduction planetary gear set and the differential planetary gear set. The drive plate selectively engages a clutch that operates to position the reduction gear set in various operation modes.

32 Claims, 5 Drawing Sheets

TRANSFER CASE WITH TWO PLANETARY GEAR SETS HAVING A COMMON CARRIER

FIELD OF THE INVENTION

The present invention relates to a transfer case used in a four-wheel drive vehicle; and more particularly to a transfer case having a two-speed planetary gear reduction unit and a planetary gear center differential.

BACKGROUND OF THE INVENTION

Transfer cases are used in vehicle drive lines, specifically full and part-time four-wheel drive vehicles to transfer power received through an input shaft typically from the vehicle transmission, to a pair of output shafts. One of the output shafts powering the front drive wheels and the other output shaft powering the rear drive wheels.

The transfer case is typically equipped with a speed or gear reduction unit for providing high-range and low-range operation. The transfer case may also incorporate additional drive or operation modes such as neutral, for disengaging the transmission from the front and rear axle for towing, and a locked position, for distributing power to both the front and rear axles to control wheel slippage with respect to the front and rear axles. Full-time or All-wheel-drive transfer cases include some type of differential unit to allow a speed variation between the front and rear axles.

In order to achieve the various drive or operation modes, transfer cases often incorporate a planetary gear set. Typically, a transfer case utilizes two separate planetary gear sets, one that functions as a reduction gear set and the second that functions as a differential gear set.

There is, however, a need to reduce the overall package size of the transfer case to provide a more compact design and enable the transfer case to fit in a smaller area. Several attempts have been made at incorporating or combining the functions of both the reduction planetary gear set and differential gear sets in the same package. While such attempts may result in a reduction in overall package size, there still remains a need for a transfer case that combines the functions of both the reduction and differential gear sets in the same device to while reducing overall part use and the corresponding size of the assembly.

SUMMARY OF THE INVENTION

Accordingly, the present invention is a unique transfer case assembly for use with a four-wheel drive vehicle. In general, the transfer case includes a planetary gear assembly located within the transfer case housing. The planetary gear assembly connects to an input shaft and front and rear output shafts. Thus, the planetary gear assembly transfers power from the input shaft to the front and rear output shafts.

The planetary gear assembly includes a reduction planetary gear set and a differential planetary gear set supported on a common carrier. The reduction planetary gear set connects to the input shaft and operates to drive a common carrier at either a high-range or low-range speed in relation to the speed of the input shaft. The differential planetary gear set includes front and rear differential planetary gear sets, the front differential planetary gear set connected to the front output shaft and the rear planetary gear set connected to the rear output shaft.

The common carrier also includes a drive plate, a differential plate and a reduction plate. In the preferred form, the drive plate is positioned between the reduction planetary gear set and the differential planetary gear set. The drive plate includes toothed portions or gear sectors that engage a correspondingly splined clutch that operates to position the reduction gear set in a high-range mode. Specifically, disengaging the clutch from the drive plate places the reduction gear set in the low-range mode.

DETAILED DESCRIPTION OF THE INVENTION

Figure 1:
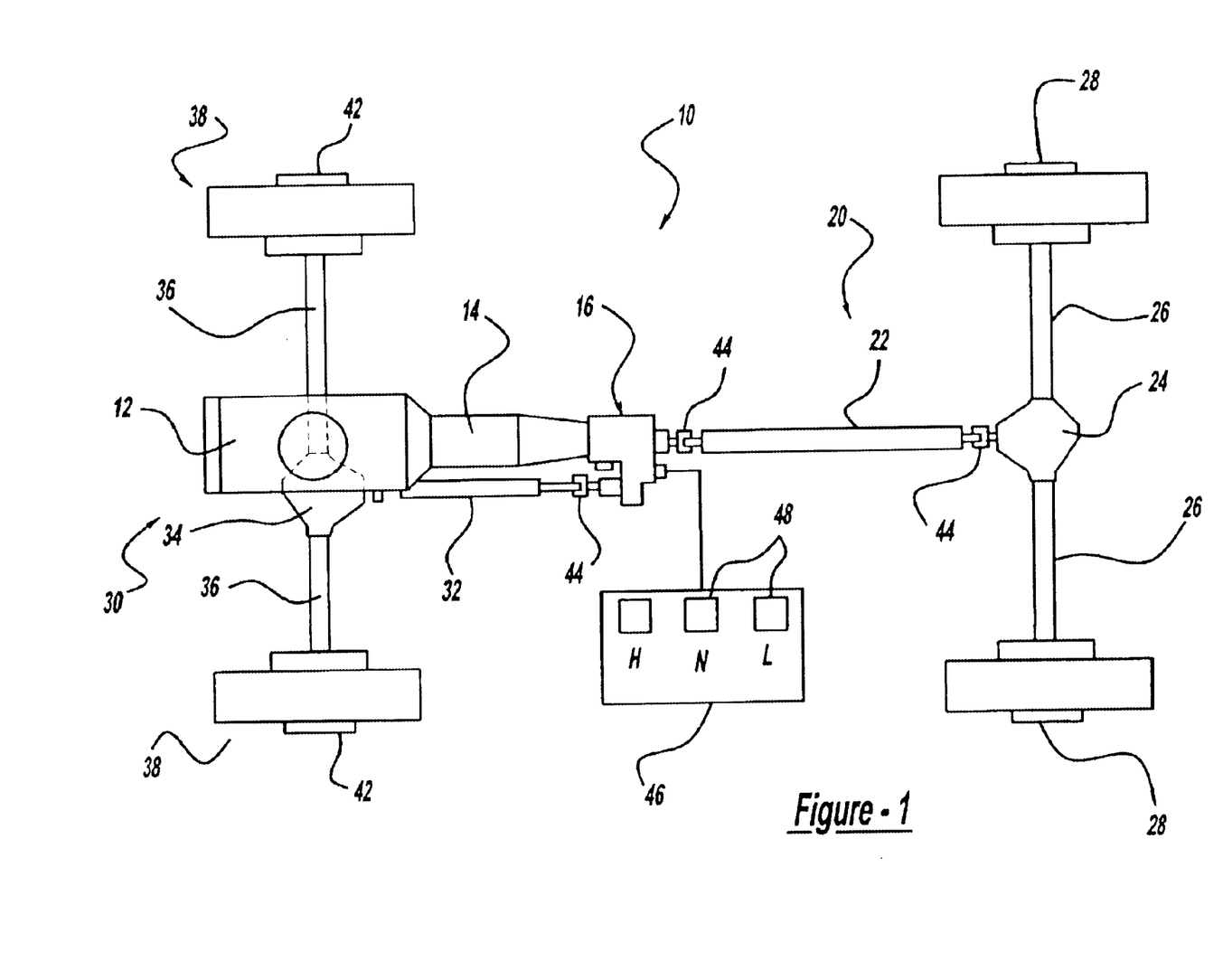
FIG. 1 is a schematic, plan view of a four-wheel drive vehicle having a transfer case according to the present invention.

Referring now to FIG. 1, a four-wheel vehicle drive train is diagrammatically illustrated and shown generally as 10. The four-wheel drive train 10 includes a prime mover 12 coupled to and directly driving a transmission 14. The transmission 14 may be an automatic or manual type. The output of the transmission 14 directly drives a transfer case assembly 16 which provides power to a primary or rear drive line 20, including a primary or rear output shaft 22, a primary or rear differential 24, a pair of live primary or rear axles 26 and a respective pair of primary or rear tire and wheel assemblies 28.

The transfer case assembly 16 also selectively provides power to a secondary or front drive line 30 including a secondary or front output shaft 32, a secondary or front differential assembly 34, a pair of live secondary or front axles 36 and a respective pair of secondary or front tire and wheel assemblies 38. The front tire and wheel assemblies 38 may be directly coupled to the front axles 36 or, if desired, a pair of manually or remotely activated locking hubs 42 may be operably disposed between the front axles 36 and the front tire and wheel assemblies 38 to selectively connect the same. Finally, both the primary drive line 20 and the secondary drive line 30 may include suitable and appropriately disposed universal joints 44 that function in conventional fashion to allow static and dynamic offsets and misalignments between the various shafts and components.

A control console 46, preferably disposed within convenient reach of the vehicle operator, includes a switch or a plurality of individual switches or pushbuttons 48 that the facilitate selection of the operating mode of the transfer case assembly 16.

While disclosed herein as front and rear drive lines 20, 30, the invention disclosed and claimed may be readily utilized in transmissions and transfer cases wherein the primary drive line 20 is disposed at the front of the vehicle and the secondary drive line 30 is disposed at the rear of the vehicle. Specifically, in those vehicles wherein the front drive line is engaged and operating substantially all of the time, i.e. a front wheel drive vehicle.

Figure 2:
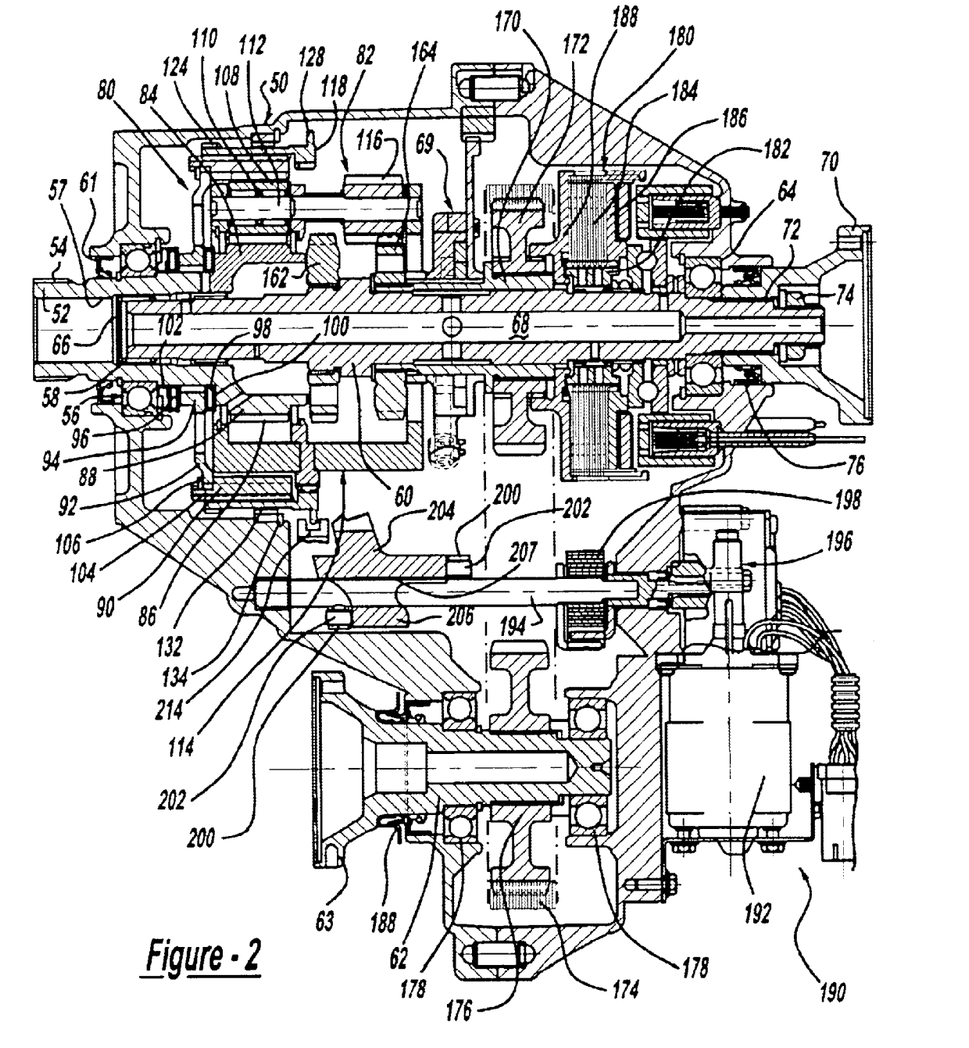
FIG. 2 is a cross-sectional view, with portions removed for clarity, of a transfer case incorporating a planetary gear and clutch assembly according to the present invention.

Referring now to FIG. 2, the transfer case assembly 16 incorporating the present invention includes a multiple piece, typically cast, housing assembly 50 having planar and circular sealing surfaces, openings for shafts and bearings and various recesses, shoulders, flanges, counter bores and the like to receive various components and assemblies of the transfer case assembly 16. An input shaft 52, rotatably mounted in the housing 50, includes splines or gear teeth 54 or other suitable structure that connects the input shaft 52 to the transmission 14 and drivingly couples the output of the transmission 14, illustrated in FIG. 1, to the input shaft 52.

A bearing assembly 56 rotatably supports the input shaft 52 on the housing 50. The input shaft 52 includes a longitudinal internal bore 57. A rear output shaft 60 is supported on one end thereof within the longitudinal bore 57 of the input shaft 52. Specifically, the rear output shaft 60 includes a roller bearing assembly 58 disposed upon the reduced diameter portion 60a of one end of the rear output shaft 60. The roller bearing assembly 58 engages the longitudinal bore 57 in the input shaft 52 and correspondingly supports the rear output shaft 60 on the input shaft 52.

An oil seal 61, positioned between the input shaft 52 and the housing assembly 50, provides an appropriate fluid tight seal between the two. An anti-friction bearing such as a ball bearing assembly 64 supports the opposite end of the output shaft 60. An end cap or seal 66 closes off the end of an axial passageway 68 in the output shaft 60. A gerotor pump seen generally at 69, is secured about and rotates with the output shaft 60, providing lubricating fluid under pressure through the axial passageway 68 which thus distributes the lubricating fluid to the components of the transfer case assembly 16. A drive hub 70 having a splined bore is positioned on the splined end 72 of the output shaft 60. The drive hub 70 is held in place by a nut 74 engaging one end of the output shaft 60. An oil seal 76, positioned between the drive hub 70 and the housing 50 provides an appropriate fluid tight seal therebetween.

The transfer case assembly 16 also includes a front output shaft 62 having a drive hub 63. Support bearings 178 support the front output shaft 62 on the housing 50. An oil seal 188 provides a fluid seal between the front output shaft 62 and the housing 50. A driven pulley 176 is attached, typically through a splined connection, to the front output shaft 62. A drive chain 174 connects the driven pulley 176 to a drive pulley 172. The drive pulley 172 is connected, again using a splined connection, to an annular drive member 170 rotatably mounted on the rear output shaft 60. Accordingly, rotation of the annular member 170 causes rotation of the front output shaft 62 and corresponding rotation of the drive hub 63.

The transfer case also includes a reduction planetary gear set, seen generally at 80 and a differential planetary gear set, seen generally at 82. The reduction planetary gear set any includes a reduction sun 84, shown in the preferred embodiment as an integral part of the input shaft 52. A plurality of gear teeth 86 are located on the outer periphery 88 of the reduction sun 84. The reduction sun 84 could also include a bore and fit over the input shaft 52 and be attached thereto in several ways, including a plurality of internal splines or gear teeth engaging complementary external splines or gear teeth formed on the input shaft 52. Accordingly, any type of connection is suitable, provided the reduction sun 84 is coupled to the input shaft 52 for rotation therewith.

A ring gear 90 is supported for relative rotational movement about the input shaft 52 by a radially extending flange member 92, connected to an annular collar or bushing 94 disposed over the input shaft 52. As shown in FIG. 2, the annular collar or bushing 94 fits over the input shaft 52 and is sandwiched between first and second radial bearings 96, 98. The first bearing 96 engaging a thrust washer 102 and the second bearing 98 engaging a shoulder 100 on the reduction sun 84. Accordingly, the annular collar or bushing 94 is constrained from longitudinal movement along the axis of the input shaft 52. The inner surface of the ring gear 90 includes an annular recess 104 that receives a radially extending flange member 92. A snap ring 106 holds the ring gear 90 on the radially extending flange member 92. Thus, while the ring gear 90 may rotate freely about the input shaft 52, it is constrained from longitudinal movement along the axis of the input shaft 52.

A plurality of pinion gears 108 are rotatably received on a plurality of anti-friction bearings, such as roller bearings 110, which in turn are supported on a plurality of stub shafts 112. The stub shafts 112 are mounted in or supported by a common carrier assembly, seen generally at 114. As set for more fully below, the common carrier assembly 114 also supports the pinion gears 116 of the differential planetary gear set 82.

Figure 3:
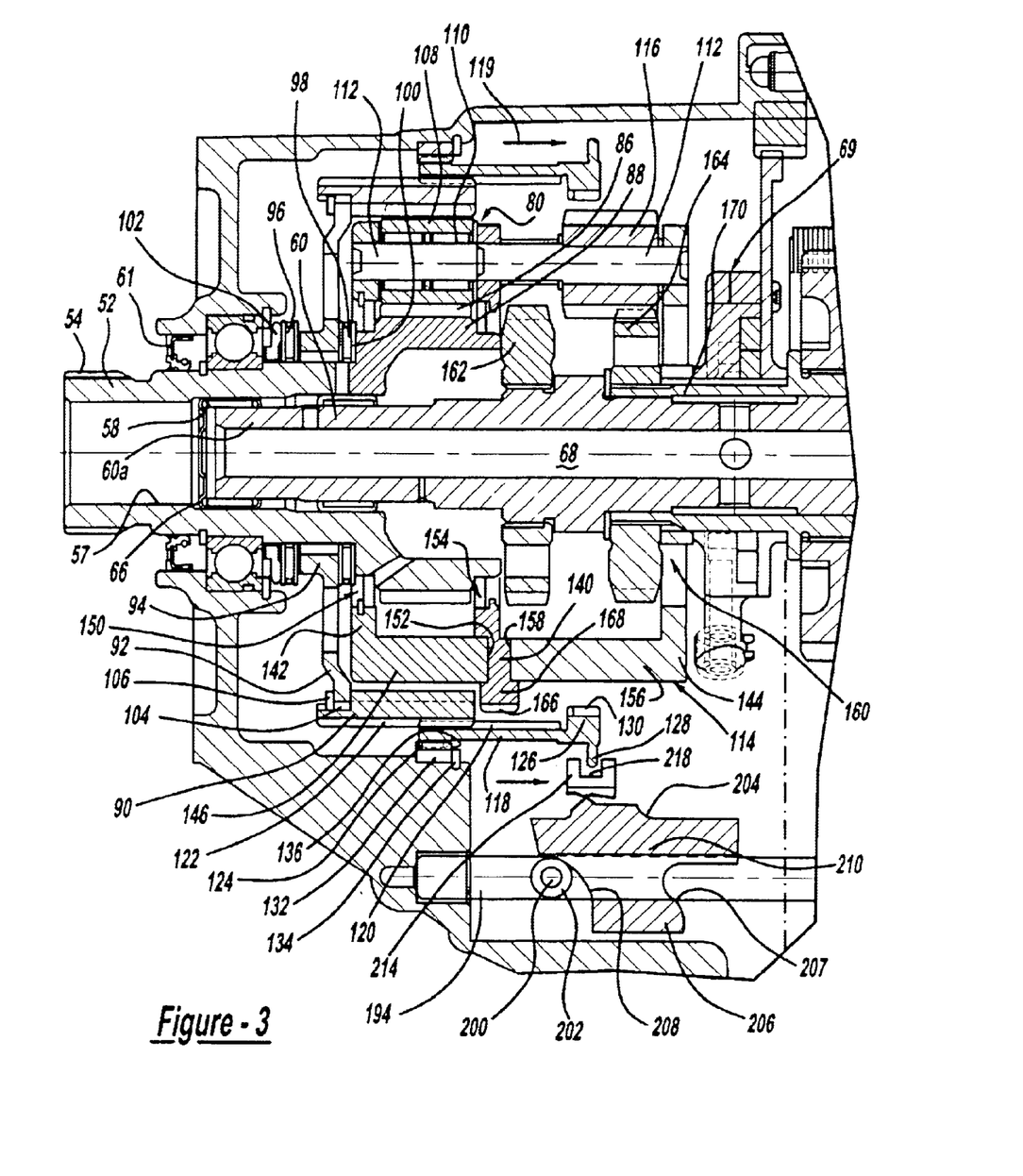
FIG. 3 is an enlarged view of the planetary gear assembly of FIG. 2 illustrating the clutch coupling the ring gear with the housing.
Figure 4:
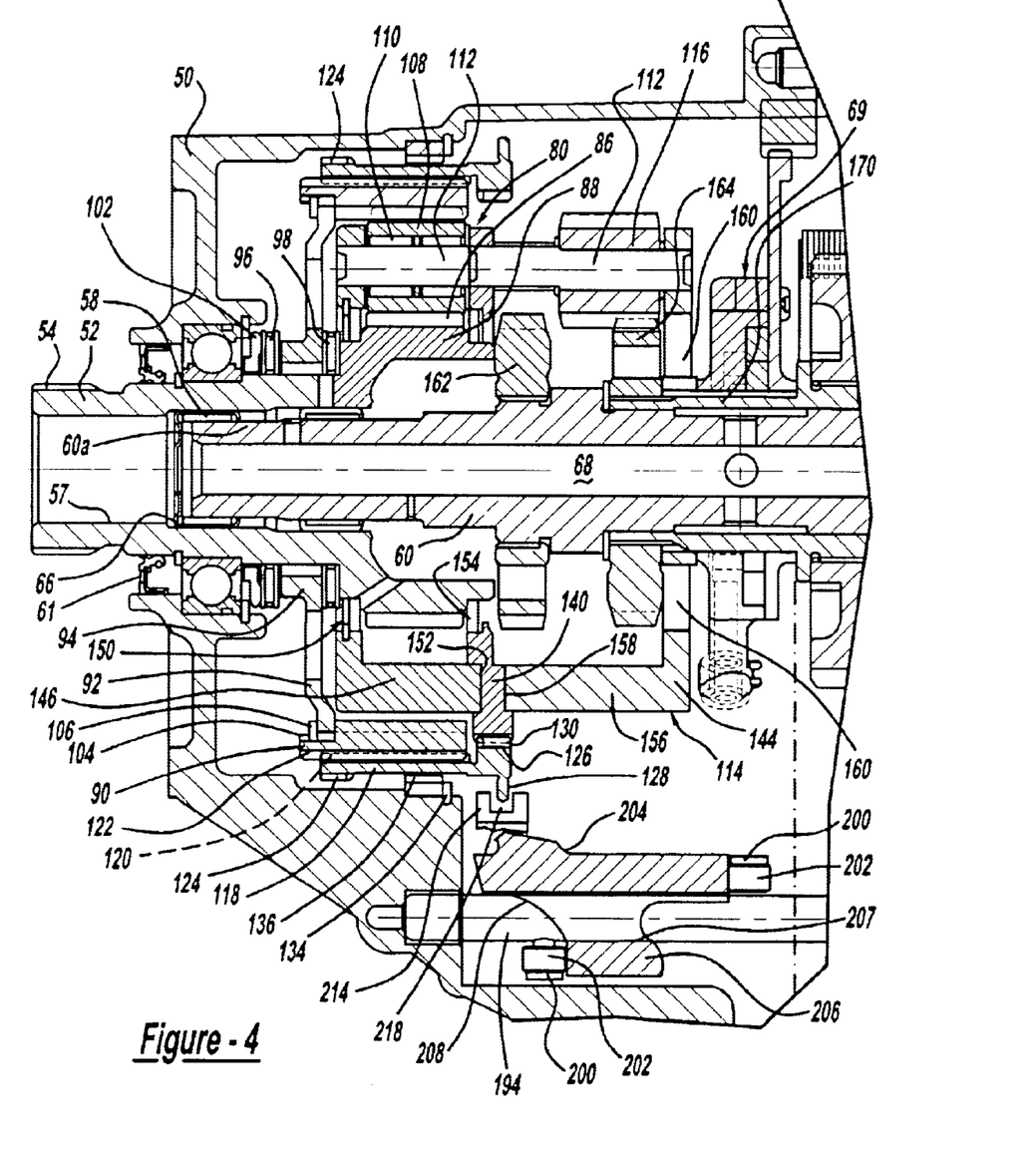
FIG. 4 is an enlarged view of the planetary gear assembly of FIG. 2 illustrating the clutch coupling the common carrier with the ring gear.

A clutch 118 is positioned about the ring gear 90 and is supported thereon for axial, sliding movement relative to the ring gear 90. In the illustrated embodiment, the clutch 118 is of the dog type. As shown in FIGS. 3 and 4, the clutch 118 is an annular member and includes a plurality of inwardly directed teeth 120 which are complementary to and mate with a like plurality of external teeth 122 disposed on the outer periphery of the ring gear 90. The clutch 118 thus rotates with the ring gear 90 but may slide axially along the outer periphery thereof. A plurality of external teeth 124 are located on one end of the outer periphery of the clutch 118. The clutch 118 further includes a radial, inwardly extending flange portion 126 and a radially, outwardly extending flange portion 128. The radial, inwardly extending flange portion 126 includes a plurality of gear teeth 130 complementary to gear teeth 166 disposed on the drive plate 140 of the common carrier assembly 114.

A stationary ring gear 132 is positioned in the housing 50 adjacent the clutch 118 and held in place by a snap ring 134. The stationary ring gear 132 has a plurality of inwardly extending gear teeth 136 that are complementary to the external teeth 124 on the outer periphery of the clutch 118.

Thus, the plurality of inwardly extending gear teeth 136 may be selectively mated with the external teeth 124 on the outer periphery of the clutch 118 as is described in greater detail below.

Figure 5:
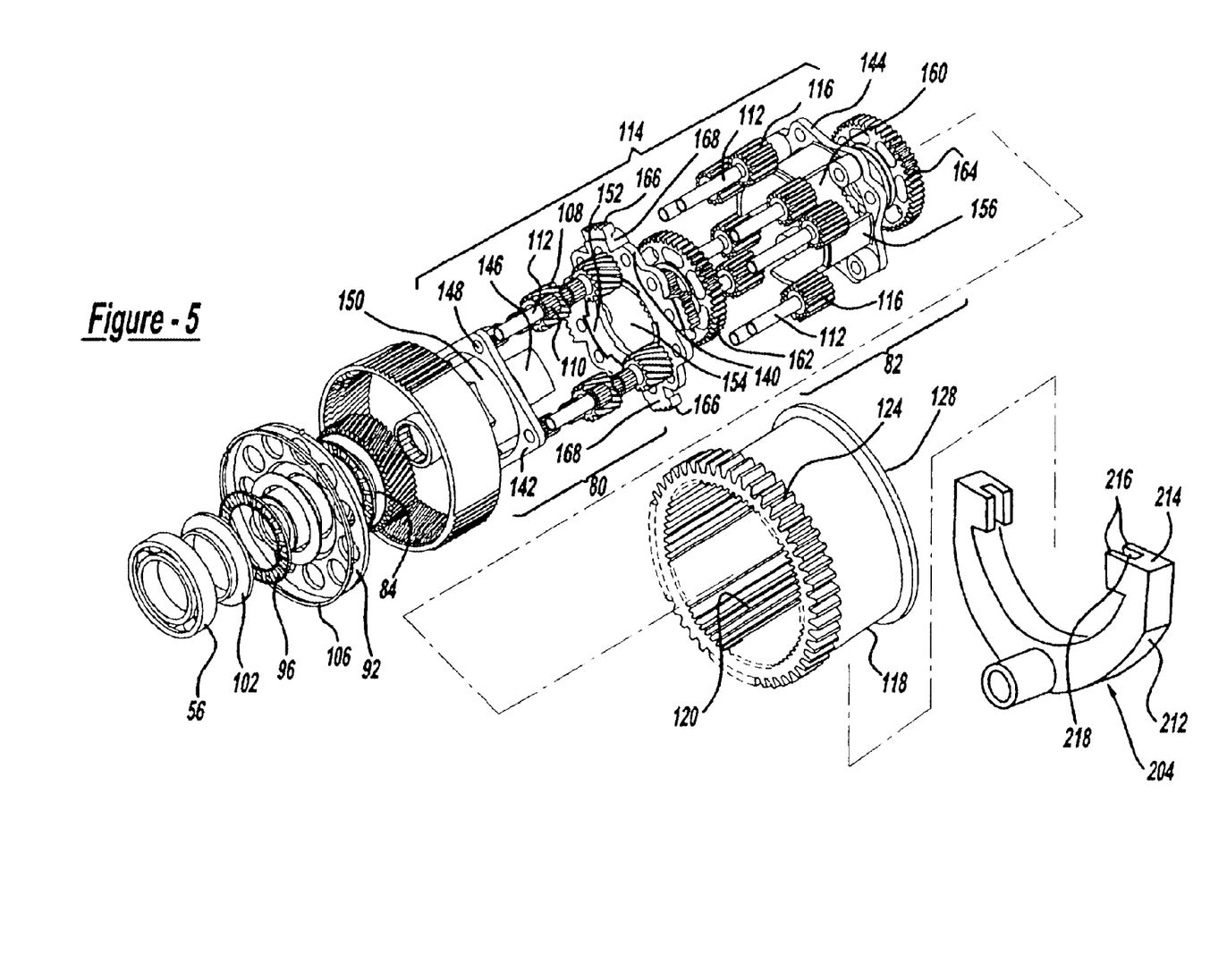
FIG. 5 is an exploded perspective view of the common carrier assembly, the reduction and differential planetary gear sets according to the present invention along with the clutch and a shift fork.

The common carrier assembly 114 includes a drive plate 140, a reduction plate 142 and a differential plate 144. As shown in FIG. 5, the respective plates, 140, 142 and 144 fit together to form the common carrier assembly 114 and support the pinion gears 108, 116 of the reduction planetary gear set 80 and the differential planetary gear set 82. The reduction plate 142 includes a plurality of axially projecting members 146, a plurality of apertures 148, located about the periphery of the reduction plate 142, and a central aperture 150. The apertures 148 located about the periphery of the reduction plate 142 receive the stub shafts 112 that support the pinion gears 108 of the reduction gear set 80. The central aperture 150 is an opening of a suitable size to allow the reduction sun gear 84 to fit into the carrier assembly 114 and engage the respective pinion gears 108. The axial projecting members 146 of the reduction plate 142 engage and are seated in corresponding notches 152 located adjacent the central aperture 154 of the drive plate 140 and space the reduction plate 142 from the drive plate 140.

On the opposite side of the drive plate 140, the differential plate 144 engages the drive plate 140 in a manner similar to the reduction plate 142. Specifically, the differential plate 144 also has a plurality of axially projecting members 156 that engage and are seated in corresponding notches 158 on the drive plate 140. Once again, the axially projecting members 156 function to properly space the differential plate 144 from the drive plate 140. As with the reduction plate 142, the differential plate 144 also includes a central aperture 160. The central aperture is of a suitable size to enable placement of first and second differential sun gears 162, 164 within the common carrier 114. The first and second differential sun gears 162, 164 are attached to the first output shaft 60 and the annular drive member 170 and engage, in a known manner, the pinion gears 116 associated with the differential planetary gear set 82. Like the pinion gears 108 of the reduction planetary gear set 80, the pinion gears 116 associated with the differential planetary gear set 82 are rotatably mounted on stub shafts 112 extending between the drive plate 140 and the differential plate 144.

Further, the drive plate 140 includes a plurality of gear teeth 166 located on a plurality of radially projecting gear sectors 168 positioned about the periphery of the drive plate 140. The gear teeth 166 are complementary to the gear teeth 130 located on the radially inwardly extending flange portion 126 of the clutch 118. Accordingly, as set for more fully below, the clutch 118 selectively engages and disengages the common carrier assembly 114 from the ring gear 90.

Referring to FIG. 2, the first differential sun gear 162 is connected, typically through a splined connection, to the rear output shaft 60. The second differential sun gear 164 is connected, again through a splined connection, to an annular drive member 170 rotatably supported on the rear output shaft 60. As set forth earlier, rotation of the annular drive member 170 operates through the drive chain 174 and corresponding drive sprocket 172 and driven sprocket pulley 176 to rotate the front output shaft 62.

The transfer case assembly 16 also includes an electro-magnetically actuated disk pack type clutch assembly 180. The clutch assembly 180 is disposed about the rear output shaft 60 and includes a circular drive member 182 that is coupled to the rear output shaft 60 through a splined connection. The disk pack clutch assembly 180 includes a plurality of interleaved friction plates or disks 184. A first plurality of the disks are coupled in an unknown manner by inter-engaging splines to a clutch hub 186 which is coupled to the rear output shaft 60 for rotation therewith. A second plurality of disks are coupled to an annular housing 188 by inter-engaging splines for rotation therewith. The annular housing 188 is disposed for rotation about the rear output shaft 60 and is coupled to the drive pulley 172. When the clutch assembly 180 is engaged it provides a locking torque between the front and rear output shafts 62, 60 to match speeds of the front and rear axles 36, 26. Those having ordinary skill in the art will appreciate that various types of clutch assemblies are suitable for transferring energy and balancing rotational speed between the rear output shaft 60 and the front output shaft 62 of the transfer case 16.

Referring now to FIGS. 2–4, an actuator, seen generally at 190, controls the position of the clutch 118. In the preferred embodiment, the actuator 190 includes an electric shift controlled motor 192. The electric shift controlled motor 192 rotates a drive shaft 194 through a worm gear drive, generally indicated at 196. The drive shaft 194 is supported for rotation in the housing 50 of the transfer case 16. The position of the drive shaft 194 is monitored and read by an encoder assembly, generally indicated at 198, that provides information about the current position of the drive shaft 194 and clutch 118. The drive shaft 194 includes a pair of spaced apart posts 200 extending outwardly therefrom. Cam followers or rollers 202 are attached to the posts 200. A shift fork assembly 204 is disposed between the cam followers 202. The shift fork assembly 204 includes a body 206 having a passageway 207 sized to enable free travel of the shift fork assembly 204 on the drive shaft 194. A helical cam surface 208 is located on the shift fork body 206. The helical cam surfaces 208 are correspondingly disposed such that the axial distance from corresponding points on the respective cam surface 208 is just slightly less than the distance between the surfaces of the cam followers 202. A flat surface on one of the helical cam surfaces 208 provides a positive stop in one direction of rotation as it engages one of the cam followers 202.

The shift fork 204 also includes an arm member 212 that terminates in a shift yoke 214 having ears 216 that define a channel or groove 218. The channel or groove 218 receives and engages the radially outwardly extending flange portion 128 of the clutch 118. The engagement of the ears 216 of the shaft yoke 214 to the flange portion 128 of the clutch 118 is shown for purposes of illustration broken away in FIGS. 3, 4. It should be understood that the shift fork 204 engages the clutch 118 at all times. Accordingly, the drive shaft 194 and corresponding cam followers 202 rotate in a known manner to move the shift fork 204 and specifically the shift yoke 214 and clutch 118 axially back and forth. Movement of the shift fork 204 selectively positions the clutch 118 and correspondingly enables selection of high-range, low-range or neutral as follows.

The clutch 118 is capable of three positions and thus three operational modes. As shown in FIGS. 2, 4 the clutch 118 is illustrated in its leftmost or direct drive, high-range position. High-range is achieved when the gear teeth 130 located on the radially inwardly projecting flange portion 126 of the clutch 118 engage the gear teeth 166 located on the gear sector 168 of the drive plate 140. When so engaged, the clutch 118 couples the ring gear 90 to the common carrier assembly 114 wherein both rotate at the speed of the input shaft 52.

As shown in FIG. 3, when the clutch 118 is moved to the right in the direction shown by arrow 119, away from the position illustrated in FIGS. 2, 4 the external teeth 124 on the outer periphery of the clutch 118 engage the gear teeth 136 of the stationary ring gear 132. When so engaged, the ring gear 90 remains stationary and the reduction planetary gear set 80 is active and provides a speed reduction between the input shaft 52 and the rear 60 and front 62 output shafts. Between these two positions is a neutral position. Positioning the clutch 118 in the center or neutral position, disconnects the clutch 118 from both the stationary ring gear 132 and the common carrier assembly 114, thus no power is transmitted to the rear 60 and front 62 output shafts.

The present invention has been described in an illustrative manner. Accordingly, the foregoing specific embodiment is shown and described for the purposes of illustrating the functional and structural principles of the invention and is subject to change without departure from such principles. The terminology used herein is intended to be in the nature of words of description rather than limitation. Therefore, this invention includes all modifications encompassed within the scope of the following claim(s).

What is claimed is:

1. A transfer case for a four-wheel drive vehicle including a transmission and a front and a rear axle comprising:

a housing;

an input shaft rotatably supported by said housing and receiving power from the transmission;

front and rear output shafts rotatably supported by said housing, said front output shaft connected to the front axle and the rear output shaft connected to the rear axle;

a common carrier assembly, said common carrier assembly supporting a reduction planetary gear set and a differential planetary gear set, said common carrier assembly, including a drive plate, a differential plate and a reduction plate, said reduction planetary gear set including a reduction sun gear, a reduction ring gear and at least one reduction planet gear, said reduction sun gear integrally formed with said input shaft and rotating with said input shaft, said at least one reduction planet gear engaging said reduction sun gear and rotatably supported by said common carrier assembly between said drive plate and said reduction plate, said reduction ring gear engaging said at least one reduction planetary gear, said differential planetary gear set including a front differential planetary gear set and a rear differential planetary gear set, said front differential planetary gear set including a front differential sun dear connected to said front output shaft, at least one front differential planetary gear supported between said drive plate and said differential plate of said common carrier assembly and engaging said front differential sun gear, said rear differential planetary gear set including a rear differential sun gear connected to said rear output shaft, at least one rear differential planetary gear supported between said drive plate and said differential plate of said common carrier assembly and engaging said rear differential sun gear;

a clutch, said clutch engaging said reduction ring gear and operative to directly couple said reduction ring gear to at least one of the following, said housing or to said common carrier assembly; and an actuator, said actuator engaging said clutch and operative to selectively position said clutch;

wherein said drive plate includes a plurality of gear teeth on at least a portion of the outer periphery thereof, wherein said plurality of gear teeth are operable to engage said clutch.

2. A transfer case for a four-wheel drive vehicle as set forth in claim 1 wherein said drive plate includes a plurality of radially projecting gear sectors, each of said sectors having a plurality of gear teeth located thereon.

3. A transfer case for a four-wheel drive vehicle as set forth in claim 1 wherein said reduction plate includes at least one axially projecting member, said axially projecting member engaging said drive plate.

4. A transfer case for a four-wheel drive vehicle as set forth in claim 1 wherein said differential plate includes at least one axially projecting member, said axially projecting member engaging said drive plate.

5. A transfer case for a four-wheel drive vehicle as set forth in claim 1 wherein said reduction plate, drive plate and differential plate each have a plurality of apertures therein; and a plurality of stub shafts positioned between said reduction plate, drive plate and differential plate and attached thereto at said apertures in said reduction plate, drive plate and differential plate.

6. A transfer case for a four-wheel drive vehicle as set forth in claim 1 wherein said clutch includes an annular member having a plurality of gear teeth on an inner surface thereof, said gear teeth on said inner surface engaging complementary gear teeth on an outer surface of said reduction ring gear, said clutch further including an inwardly extending flange portion, said flange portion having a plurality of gear teeth located thereon, said gear teeth located on said inwardly extending flange portion complementary to and selectively engageable with a plurality of gear teeth on said common carrier assembly.

7. A transfer case for a four-wheel drive vehicle as set forth in claim 1 wherein said clutch includes a plurality of gear teeth on at least a portion of the outer periphery of said clutch, said gear teeth complementary to and selectively engageable with a plurality of gear teeth located on a stationary ring gear secured to said housing.

8. A transfer case for a four-wheel drive vehicle as set forth in claim 1 wherein said clutch includes a radially outwardly extending flange portion; and a shift yoke connected to said actuator, said shift yoke including a shift fork having a channel therein, wherein said radially outwardly extending flange portion of said clutch is disposed within said channel.

9. A transfer case for a four-wheel drive vehicle as set forth in claim 1 wherein said clutch slidably engages said reduction ring gear for axial movement thereon.

10. A transfer case for a four-wheel drive vehicle as set forth in claim 1 including an annular member mounted for rotation on said input shaft; said annular member including a radially extending flange member wherein said ring gear is rotatably supported by said flange member.

11. A transfer case for a four-wheel drive vehicle as set forth in claim 1 including said reduction plate and said differential plate each having an aperture therein, said aperture on said reduction plate of a size sufficient to enable passage of the reduction sun gear and said aperture on said differential plate of a size sufficient to enable passage of said front and rear differential sun gears.

12. A transfer case for a four-wheel drive vehicle as set forth in claim 11 wherein said common carrier assembly includes a plurality of stub shafts connected to said reduction plate, drive plate and differential plate, said stub shafts supporting a plurality of reduction planet gears and differential planet gears.

13. A transfer case for a four-wheel drive vehicle as set forth in claim 1 wherein said common carrier assembly includes said reduction plate and said differential plate having at least one axially projecting member that engages said drive plate.

14. A transfer case for a four-wheel drive vehicle including a transmission and a front and a rear axle comprising:
   a housing;
   an input shaft rotatably supported by said housing and receiving power from the transmission;
   front and rear output shafts rotatably supported by said housing, said front output shaft connected to the front axle and the rear output shaft connected to the rear axle;
   a common carrier assembly, said common carrier assembly supporting a reduction planetary gear set and a differential planetary gear set, said common carrier assembly, including a drive plate, a differential plate and a reduction plate, said reduction planetary gear set including a reduction sun gear, a reduction ring gear and at least one reduction planet gear, said reduction sun gear connected to and rotating with said input shaft, said at least one reduction planet gear engaging said reduction sun gear and rotatably supported by said common carrier assembly between said drive plate and said reduction plate, said reduction ring gear engaging said at least one reduction planetary gear, said differential planetary gear set including a front differential planetary gear set and a rear differential planetary gear set, said front differential planetary gear set including a front differential sun gear connected to said front output shaft, at least one front differential planetary gear supported between said drive plate and said differential plate of said common carrier assembly and engaging said front differential sun gear, said rear differential planetary gear set including a rear differential sun gear connected to said rear output shaft, at least one rear differential planetary gear supported between said drive plate and said differential plate of said common carrier assembly and engaging said rear differential sun gear;
   a clutch, said clutch engaging said reduction ring gear and operative to couple said reduction ring gear to at least one of the following, said housing or common carrier assembly, said clutch including an annular member having a plurality of gear teeth on an inner surface thereof and an inwardly extending flange portion, said flange portion having a plurality of gear teeth located thereon which are complementary to and selectively engageable with a plurality of gear teeth on said common carrier assembly, said clutch includes a plurality of gear teeth on at least a portion of the outer periphery which are complementary to and selectively engageable with gear teeth located on a stationary ring gear secured on said housing; and
   an actuator, said actuator engaging said clutch and operative to selectively position said clutch.

15. A transfer case for a four-wheel drive vehicle as set forth in claim 14 wherein said clutch is supported on said reduction ring gear for axial movement thereon.

16. A transfer case for a four-wheel drive vehicle as set forth in claim 14 including an annular member mounted for rotation within said housing about the axis of said input shaft; said annular member including a radially extending flange member wherein said reduction ring gear is connected to said flange member.

17. A transfer case for a four-wheel drive vehicle as set forth in claim 15 wherein said clutch includes a radially outwardly extending flange portion; and
   a shift yoke connected to said actuator, said shift yoke including a shift fork having a channel therein, wherein said radially outwardly extending flange portion of said clutch is disposed within said channel.

18. A transfer case for a four-wheel drive vehicle including a transmission and a front and a rear axle comprising:
   a housing;
   an input shaft rotatably supported by said housing and receiving power from the transmission;
   front and rear output shafts rotatably supported by said housing, said front output shaft connected to the front axle and said rear output shaft connected to the rear axle;
   a common carrier assembly, said common carrier assembly supporting a reduction planetary gear set and a differential planetary gear set, said common carrier assembly, including a drive plate, a differential plate and a reduction plate, said reduction plate and said differential plate having at least one axially projecting member that engages said drive plate, said reduction planetary gear set including a reduction sun gear, a reduction ring gear and at least one reduction planet gear, said reduction sun gear integrally formed with said input shaft and rotating with said input shaft, said at least one reduction planet gear engaging said reduction sun gear and rotatably supported by said common carrier assembly between said drive plate and said reduction plate, said reduction ring gear engaging said at least one reduction planetary gear, said differential planetary gear set including a front differential planetary gear set and a rear differential planetary gear set, said front differential planetary gear set including a front differential sun gear connected to said front output shaft, at least one front differential planetary gear supported between said drive plate and said differential plate of said common carrier assembly and engaging said front differential sun gear, said rear differential planetary gear set including a rear differential sun gear connected to said rear output shaft, at least one rear differential planetary gear supported between said drive plate and said differential plate of said common carrier assembly and engaging said rear differential sun gear;
   stub shafts connected to said reduction plate, drive plate and differential plate, said stub shafts supporting said reduction planet gears and differential planet gears;
   a clutch, said clutch engaging said reduction ring gear and operative to directly couple said reduction ring gear to at least one of the following, said housing or common carrier assembly; and an actuator, said actuator engaging said clutch and operative to selectively position said clutch;

wherein said drive plate includes a plurality of gear teeth on at least a portion of the outer periphery thereof, wherein said plurality of pear teeth are operable to engage said clutch.

19. A transfer case for a four-wheel drive vehicle as set forth in claim 18 wherein said clutch is an annular member having a plurality of gear teeth on an inner surface thereof, said clutch further including an inwardly extending flange portion, said flange portion having a plurality of gear teeth located thereon, said gear teeth located on said flange portion complementary to and selectively engageable with a plurality of gear teeth on said common carrier assembly; and a plurality of gear teeth on at least a portion of the outer periphery of said clutch, said gear teeth complementary to and selectively engageable with said gear teeth located on a stationary ring gear secured to said housing.

20. A transfer case for a four-wheel drive vehicle including a transmission and a front and a rear axle comprising:

a housing;

an input shaft rotatably supported by said housing and receiving power from the transmission;

front and rear output shafts rotatably supported by said housing, said front output shaft connected to the front axle and the rear output shaft connected to the rear axle;

a common carrier assembly, said common carrier assembly supporting a reduction planetary gear set and a differential planetary gear set, said common carrier assembly, including a drive plate, a differential plate and a reduction plate, said reduction planetary gear set including a reduction sun gear, a reduction ring gear and at least one reduction planet gear, said reduction sun gear connected to and rotating with said input shaft, said at least one reduction planet gear engaging said reduction sun gear and rotatably supported by said common carrier assembly between said drive plate and said reduction plate, said reduction ring gear engaging said at least one reduction planetary gear, said differential planetary gear set including a front differential planetary gear set and a rear differential planetary gear set, said front differential planetary gear set including a front differential sun gear connected to said front output shaft, at least one front differential planetary gear supported between said drive plate and said differential plate of said common carrier assembly and engaging said front differential sun gear, said rear differential planetary gear set including a rear differential sun gear connected to said rear output shaft, at least one rear differential planetary gear supported between said drive plate and said differential plate of said common carrier assembly and engaging said rear differential sun gear;

a clutch, said clutch engaging said reduction ring gear and operative to couple said reduction ring gear to at least one of the following, said housing or to said common carrier assembly; and an actuator, said actuator engaging said clutch and operative to selectively position said clutch;

wherein either of said reduction plate or said differential plate includes at least one axially projecting member, said axially projecting member engaging said drive plate.

21. A transfer case for a four-wheel drive vehicle as set forth in claim 20 wherein said drive plate includes a plurality of gear teeth on at least a portion of the outer periphery thereof.

22. A transfer case for a four-wheel drive vehicle as set forth in claim 20 wherein said drive plate includes a plurality of radially projecting gear sectors, each of said sectors having a plurality of gear teeth located thereon.

23. A transfer case for a four-wheel drive vehicle as set forth in claim 20 wherein said reduction plate, drive plate and differential plate each have a plurality of apertures therein; and a plurality of stub shafts positioned between said reduction plate, drive plate and differential plate and attached thereto at said apertures in said reduction plate, drive plate and differential plate.

24. A transfer case for a four-wheel drive vehicle as set forth in claim 20 wherein said clutch includes an annular member having a plurality of gear teeth on an inner surface thereof, said gear teeth on said inner surface engaging complementary gear teeth on an outer surface of said reduction ring gear, said clutch further including an inwardly extending flange portion, said flange portion having a plurality of gear teeth located thereon, said gear teeth located on said inwardly extending flange portion complementary to and selectively engageable with a plurality of gear teeth on said common carrier assembly.

25. A transfer case for a four-wheel drive vehicle as set forth in claim 20 wherein said clutch includes a plurality of gear teeth on at least a portion of the outer periphery of said clutch, said gear teeth complementary to and selectively engageable with a plurality of gear teeth located on a stationary ring gear secured to said housing.

26. A transfer case for a four-wheel drive vehicle as set forth in claim 20 wherein said clutch includes a radially outwardly extending flange portion; and a shift yoke connected to said actuator, said shift yoke including a shift fork having a channel therein, wherein said radially outwardly extending flange portion of said clutch is disposed within said channel.

27. A transfer case for a four-wheel drive vehicle as set forth in claim 20 wherein said clutch slidably engages said reduction ring gear for axial movement thereon.

28. A transfer case for a four-wheel drive vehicle as set forth in claim 20 including an annular member mounted for rotation on said input shaft; said annular member including a radially extending flange member wherein said ring gear is rotatably supported by said flange member.

29. A transfer case for a four-wheel drive vehicle as set forth in claim 20 including said reduction plate and said differential plate each having an aperture therein, said aperture on said reduction plate of a size sufficient to enable passage of the reduction sun gear and said aperture on said differential plate of a size sufficient to enable passage of said front and rear differential sun gears.

30. A transfer case for a four-wheel drive vehicle as set forth in claim 29 wherein said common carrier assembly includes a plurality of stub shafts connected to said reduction plate, drive plate and differential plate, said stub shafts supporting a plurality of reduction planet gears and differential planet gears.

31. A transfer case for a four-wheel drive vehicle as set forth in claim 20 wherein said common carrier assembly includes said reduction plate and said differential plate having at least one axially projecting member that engages said drive plate.

32. A transfer case for a four-wheel drive vehicle including a transmission and a front and a rear axle comprising:

a housing;

an input shaft rotatably supported by said housing and receiving power from the transmission;

front and rear output shafts rotatably supported by said housing, said front output shaft connected to the front axle and said rear output shaft connected to the rear axle;

a common carrier assembly, said common carrier assembly supporting a reduction planetary gear set and a differential planetary gear set, said common carrier assembly, including a drive plate, a differential plate and a reduction plate, said reduction plate and said differential plate having at least one axially projecting member that engages said drive plate, said reduction planetary gear set including a reduction sun gear, a reduction ring gear and at least one reduction planet gear, said reduction sun gear connected to and rotating with said input shaft, said at least one reduction planet gear engaging said reduction sun gear and rotatably supported by said common carrier assembly between said drive plate and said reduction plate, said reduction ring gear engaging said at least one reduction planetary gear, said differential planetary gear set including a front differential planetary gear set and a rear differential planetary gear set, said front differential planetary gear set including a front differential sun gear connected to said front output shaft, at least one front differential planetary gear supported between said drive plate and said differential plate of said common carrier assembly and engaging said front differential sun gear, said rear differential planetary gear set including a rear differential sun gear connected to said rear output shaft, at least one rear differential planetary gear supported between said drive plate and said differential plate of said common carrier assembly and engaging said rear differential sun gear;

stub shafts connected to said reduction plate, drive plate and differential plate, said stub shafts supporting said reduction planet gears and differential planet gears;

a clutch, said clutch engaging said reduction ring gear and operative to couple said reduction ring gear to at least one of the following, said housing or common carrier assembly;

an actuator, said actuator engaging said clutch and operative to selectively position said clutch;

wherein said clutch is an annular member having a plurality of gear teeth on an inner surface thereof, said clutch further including an inwardly extending flange portion, said flange portion having a plurality of gear teeth located thereon, said gear teeth located on said flange portion complementary to and selectively engageable with a plurality of gear teeth on said common carrier assembly; and a plurality of gear teeth on at least a portion of the outer periphery of said clutch, said gear teeth complementary to and selectively engageable with said gear teeth located on a stationary ring gear secured to said housing.

* * * * *

UNITED STATES PATENT AND TRADEMARK OFFICE
CERTIFICATE OF CORRECTION

PATENT NO. : 6,837,819 B2
DATED : January 4, 2005
INVENTOR(S) : Thomas J. Foster It is certified that error appears in the above-identified patent and that said Letters Patent is hereby corrected as shown below:

Column 1,
Line 47, "device to while reducing" should be -- device while reducing --.

Column 4,
Line 3, "gear set any includes" should be -- gear set includes --.
Line 36, "for" should be -- forth --.

Column 5,
Line 49, "for" should be -- forth --.

Column 7,
Line 61, "dear" should be -- gear --.

Column 11,
Line 7, "pear" should be -- gear --.

Signed and Sealed this

Sixth Day of September, 2005

JON W. DUDAS
*Director of the United States Patent and Trademark Office*